United States Patent [19]

Kusaka et al.

[11] Patent Number: 4,649,768

[45] Date of Patent: Mar. 17, 1987

[54] CONTROLLER DEVICE FOR WHEELED CONSTRUCTION MACHINE

[75] Inventors: Kohei Kusaka, Sayama; Masaaki Ichimura, Tokorozawa; Yuuichi Anami, Sayama, all of Japan

[73] Assignee: Kabushiki Kaisha Komatsu Seisakusho, Tokyo, Japan

[21] Appl. No.: 810,145

[22] Filed: Dec. 18, 1985

[51] Int. Cl.$^4$ .......................... G05G 1/00; H01H 9/00; B60K 23/00

[52] U.S. Cl. .............................. 74/484 R; 74/473 SW; 180/78; 200/61.54; 200/61.88

[58] Field of Search ......... 74/473 SW, 484 R, 473 R; 180/78; 200/61.54, 61.88

[56] References Cited

U.S. PATENT DOCUMENTS

| | | | |
|---|---|---|---|
| 3,857,454 | 12/1974 | Kobayashi et al. | 180/78 |
| 4,293,743 | 10/1981 | Iwata et al. | 200/61.54 X |
| 4,334,130 | 6/1982 | Beig | 200/61.54 |
| 4,423,297 | 12/1983 | Berginski | 200/61.54 |
| 4,429,196 | 1/1984 | Beig et al. | 200/61.54 |
| 4,571,786 | 2/1986 | Osujo | 180/78 X |

FOREIGN PATENT DOCUMENTS 1128302 4/1962 Fed. Rep. of Germany ........ 180/78

Primary Examiner—Allan D. Herrmann
Attorney, Agent, or Firm—Armstrong, Nikaido, Marmelstein & Kubovcik

[57] ABSTRACT

A controller device for a wheeled construction machine has a variable speed lever for electrically controlling steps of speed of a transmission disposed near a steering wheel. It comprises a combination switch box disposed at the top of a steering column, a variable speed lever of a length enough for the leading end thereof to protrude slightly from the periphery of the steering wheel disposed on the left side of the combination switch box in such a manner as to approximate the steering wheel, and a control lever for turning on and off various lamps disposed protrudingly on the right side of the combination switch box. At least either of the variable speed lever and the control lever is attached to the combination switch box.

3 Claims, 4 Drawing Figures

CONTROLLER DEVICE FOR WHEELED CONSTRUCTION MACHINE

BACKGROUND OF THE INVENTION

1. Field of the Invention:

This invention relates to a controller device for a wheeled construction machine, having a variable speed lever capable of electrically controlling a transmission near a steering wheel.

2. Description of the Prior Art:

An electric controller device for a transmission is known to the art as disclosed in the specification of Japanese Patent Publication No. SHO 52(1977)-17,303, for example. It has already found utility in wheeled construction machines.

In the conventional wheeled construction vehicles such as the wheel loader, the variable speed lever disposed productingly beside the steering column is manually manipulated to effect required transmission control. Where the variable speed lever is of a column shift type and the variable speed lever is positioned at a large distance from the steering wheel, the operator of the vehicle is required to operate the variable speed lever, the steering wheel, and the vehicle control lever interchangeably, particularly during the work of excavation. During change of speed, the operator grips the steering wheel in his right hand and manipulates the variable speed lever in his left hand. For manipulation of the vehicle control lever, he now grips the steering wheel in his left hand and uses his right hand for the control of the vehicle. This system has the disadvantage that the operation thereof is complicated and is deficient in safety.

SUMMARY OF THE INVENTION

An object of this invention, therefore, is to provide a controller device for a construction machine, which enables the operator to use his left hand in gripping the steering wheel and the fingers of the same left hand in manipulating the variable speed lever and his right hand exclusively in controlling the vehicle control lever so as to eliminate the compexity of operation and improve the safety.

To attain the object described above, this invention provides a controller device for a wheeled construction machine, which comprises a combination switch box disposed adjacent the top of a steering column, a variable speed lever for electrically controlling steps of speed of a transmission disposed on the left side of the combination switch box, the variable speed lever being of a length so that the leading end thereof protrudes from the periphery of the steering wheel, a control lever for turning on and off various lamps disposed protrudingly on the right side of the combination switch box, and at least one of the variable speed lever and the control lever being attached to the combination switch box.

The other advantages, features, and objects of the present invention will become apparent to those skilled in the art upon making reference to the following detailed description and accompanying drawings in which preferred embodiments of the present invention are shown by way of illustration.

DETAILED DESCRIPTION OF THE INVENTION

Figure 1:
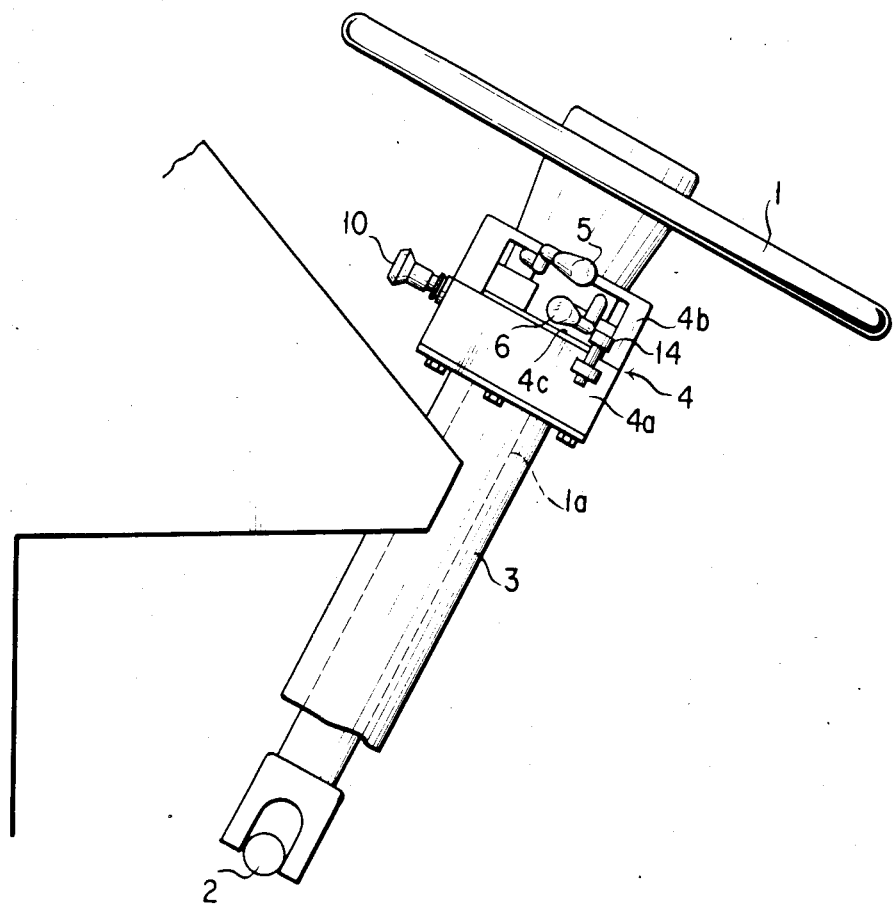
FIG. 1 is a side view illustrating a typical embodiment of this invention.

Now, a typical embodiment of this invention will be described in detail below. In the drawings, a steering wheel 1 is provided for such a construction machine as a wheel loader. It is attached adjacent the upper end of a steering shaft 1a enclosed in a steering column 3 tiltable about a fulcrum 2. A combination switch box 4 is attached to the upper end of the aforementioned steering column 3. This combination switch box is formed in the shape of a rectangular box divided vertically into two parts. A lower case 4a is given a tightly closed construction owing to a partition 4c interposed between upper and lower cases 4a, 4b. This lower case 4a contains therein an assortment of switches (not shown). Two variable speed levers 5, 6 protrude from one lateral part of the upper case 4b. Of these two levers 5, 6, the former 5 is used for selection between forward and rearward travels and the latter 6 for selection among speed steps. They are supported on their respective basal sides within the upper case 4b through the medium of pivots 5a, 5b. These variable speed levers 5, 6 are such that their operation in the circumferential direction along the periphery of the steering wheel 1 actuates the switches disposed, though not illustrated, inside the lower case 4a and consequently effects electric-hydraulic control of the transmission which is connected, though not illustrated, to the switches. A stopper 14 is disposed nearby.

Figure 2:
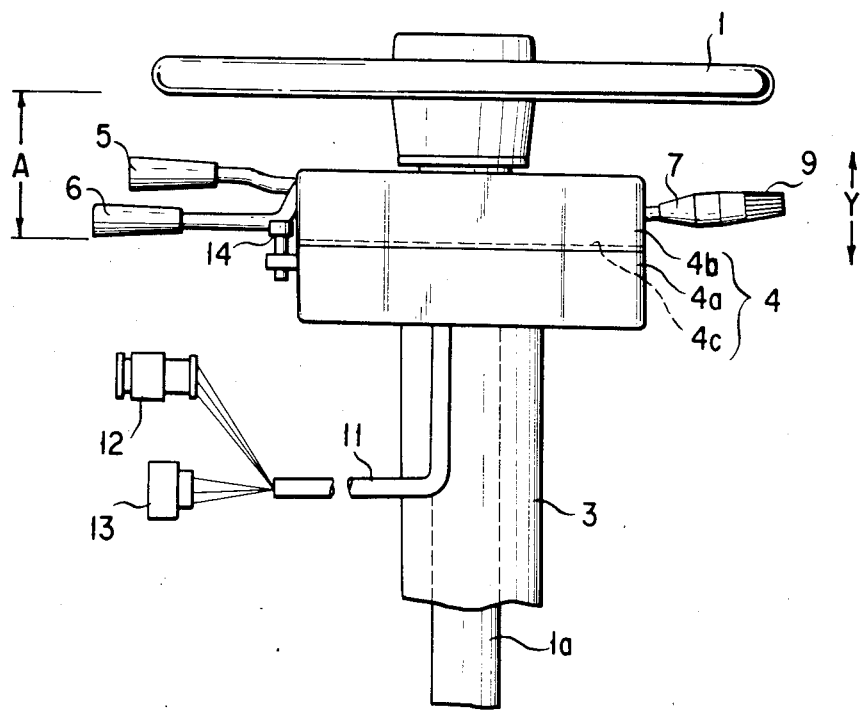
FIG. 2 is a magnified side view of the neighborhood of a steering wheel.
Figure 3:
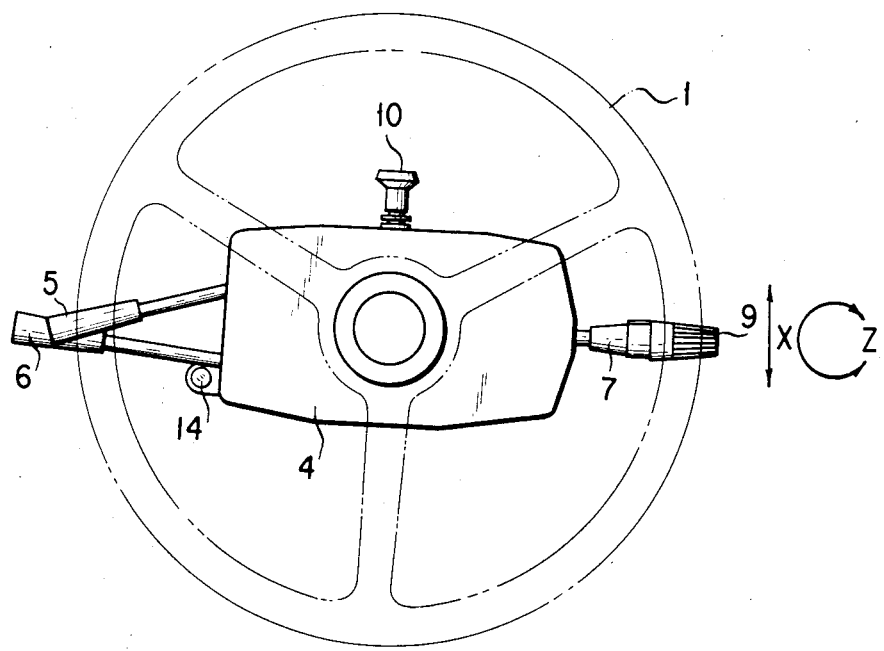
FIG. 3 is a plan view of the steering wheel.
Figure 4:
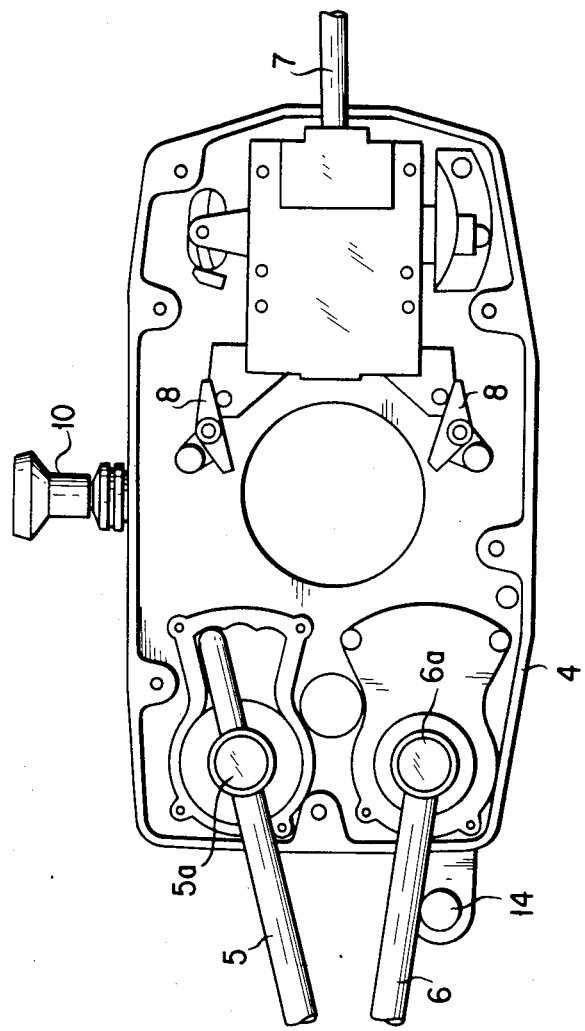
FIG. 4 is a lateral cross section of a combination switch box.

The aforementioned levers 5, 6 have lengths enough for their leading ends to protrude slightly from the periphery of the steering wheel 1 so that they may be operated by the finger tips of the operator's hand keeping a grip of the steering wheel 1. Moreover, the two levers 5, 6 are disposed at a short distance from each other so that they may be operated simultaneously. Their distances from the steering wheel A, FIG. 2, are limited roughly in the range of 30 to 100 mm. As the result, the vehicular speed can be safely changed. Since the levers 5, 6 are small and light as compared with their conventional counterparts, they can be operated lightly with the operator's finger tips. They are, therefore, not required to possess any appreciably high strength and their supporting parts do not require reinforcement. From the other lateral side of the upper case 4b is projected a control lever or switch lever 7 which is capable of being moved longitudinally, X, FIG. 3, and vertically Y, FIG. 2. When the control lever 7 is moved in the longitudinal direction, a winker switch contained, though not illustrated, within the lower case 4a is set to turn on or off a winker lamp. A self-cancelling mechanism 8 is disposed near the seat of the aforementioned control lever 7 inside the upper case 4b. The self-cancelling mechanism 8 serves to enable the control lever 7 which has been moved forward or rearward to be returned automatically to its neutral position by giving to the steering wheel 1 a turn in the direction opposite the direction in which the steering wheel 1 has been rotated so far. Owing to this arrangement, the possibility of the winker lamp being left blinking through the operator's negligence is precluded. Moreover, this winker switch is not affected by rainwater and other similar weather conditions because it is contained in a tightly closed lower case 4a. The aforementioned control lever 7 is provided at the leading end thereof with a rotatable knob 9. By rotating this knob 9, as indicated by the arrow Z, FIG. 3, a head lamp switch and a parking lamp switch contained, though not illustrated, inside a neck part are switched to turn on and off head lamps and parking lamps. By vertically moving the control lever 7, the head lamp can be switched between upward and downward tilt. Since the head lamp and the parking lamp are switched by one and the same knob 9, there is attained the advantage that the parking lamp left glowing through the operator's negligence is turned off without fail when the head lamp is turned on.

A knob 10 of a hazard lamp switch (not shown) protrudes from the front side of the lower case 4a. By this knob 10, the hazard switch disposed inside the lower case 4a can be controlled.

A corrugated tube 11 for wiring and connectors 12, 13 are conveniently disposed. Thus, the combination switch box incorporated in the present system contributes to simplifying the work of wiring.

Obviously, many modifications and variations of the present invention are possible in light of the preceding teachings. It is therefore to be understood that within the scope of the appended claims, the present invention may be practiced otherwise than as specifically described herein.

What is claimed is:

1. A controller device for a wheeled construction machine, comprising a combination switch box disposed adjacent the top of a steering column, a variable speed lever for electrically controlling the speed steps of a transmission disposed on the left side of said combination switch box, said variable speed lever being of a length so that the leading end thereof protrudes from the periphery of said steering wheel, a control lever for turning on and off various lamps disposed on the right side of said combination switch box, and at least one of said variable speed lever and said control lever being attached to said combination switch box, said left side of said switch box further including a second lever for selection of speed, said variable speed and second levers being separated from each other by a short distance and being supported inside said combination switch box through the medium of pivots so as to be separated from the steering wheel by distances in the range of about 30 mm to about 100 mm.

2. A controller device according to claim 1 wherein said combination switch box is divided vertically into a lower tightly closed case for containing therein various switches and an upper case possessing openings for projection of said levers.

3. A controller device according to claim 1, wherein said control lever is adapted to actuate a winker switch by a motion thereof in the longitudinal direction and to permit selection between upward and downward tilt of head lamps by a motion thereof in the vertical direction, a knob adapted to actuate a head lamp switch and a parking lamp switch by a rotation thereof is disposed at the leading end of said control lever, and a self-cancelling mechanism is disposed near the seat of said control lever.

* * * * *